Sept 3, 1957  R. W. BROWN  2,805,389
APPARATUS FOR TESTING ARTICLES
Filed May 27, 1953  3 Sheets-Sheet 1
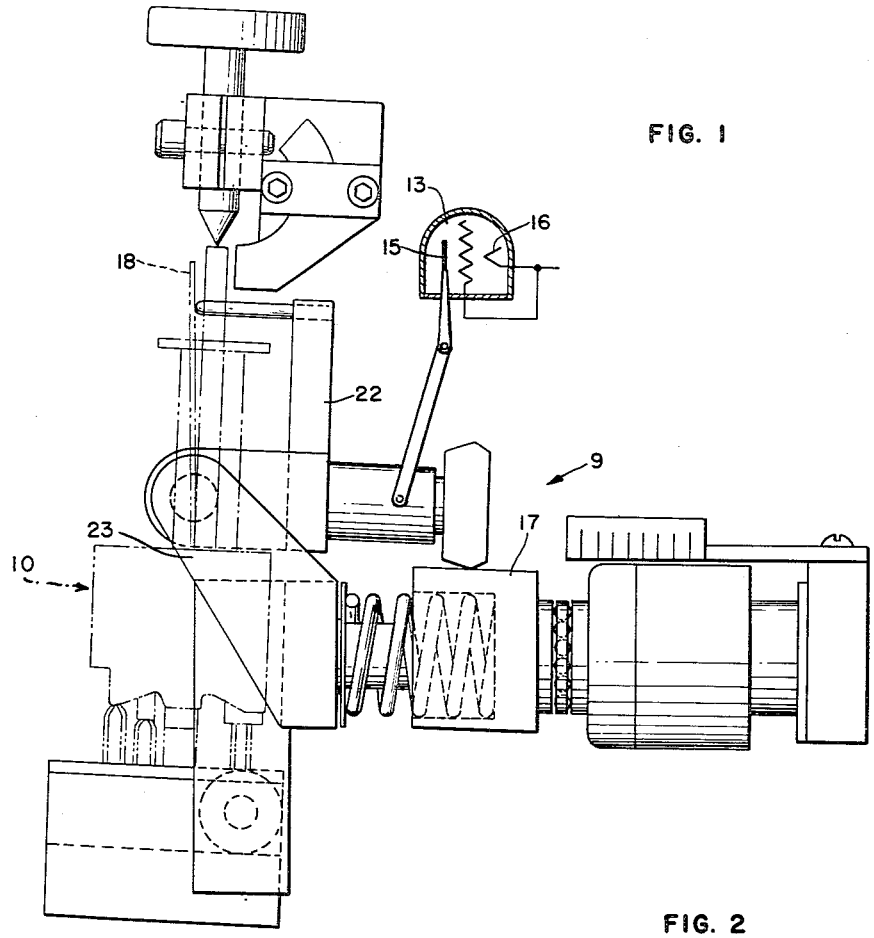
FIG. 1
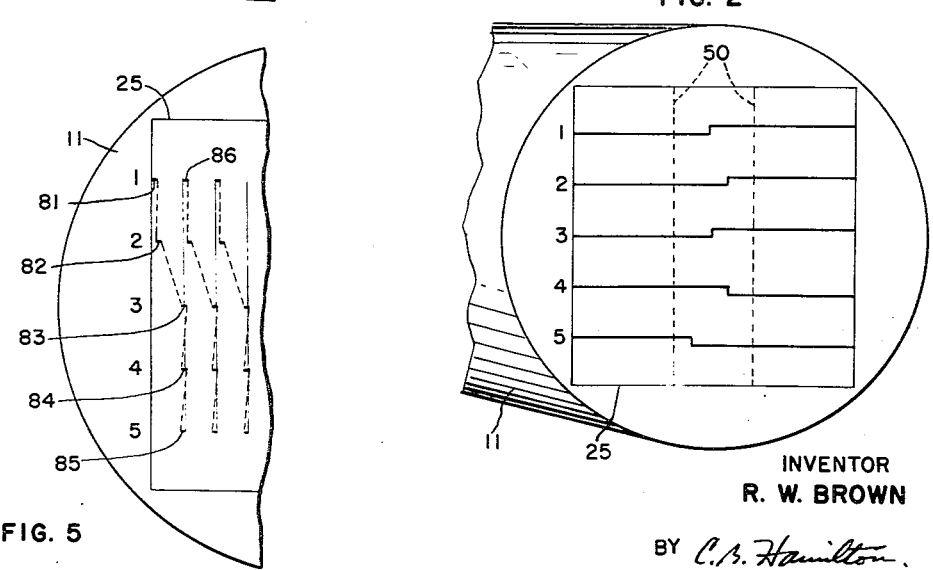
FIG. 5
FIG. 2
INVENTOR
R. W. BROWN
BY C. B. Hamilton
ATTORNEY Sept 3, 1957 R. W. BROWN 2,805,389
APPARATUS FOR TESTING ARTICLES
Filed May 27, 1953 3 Sheets-Sheet 2

INVENTOR
R. W. BROWN
BY C. B. Hamilton
ATTORNEY

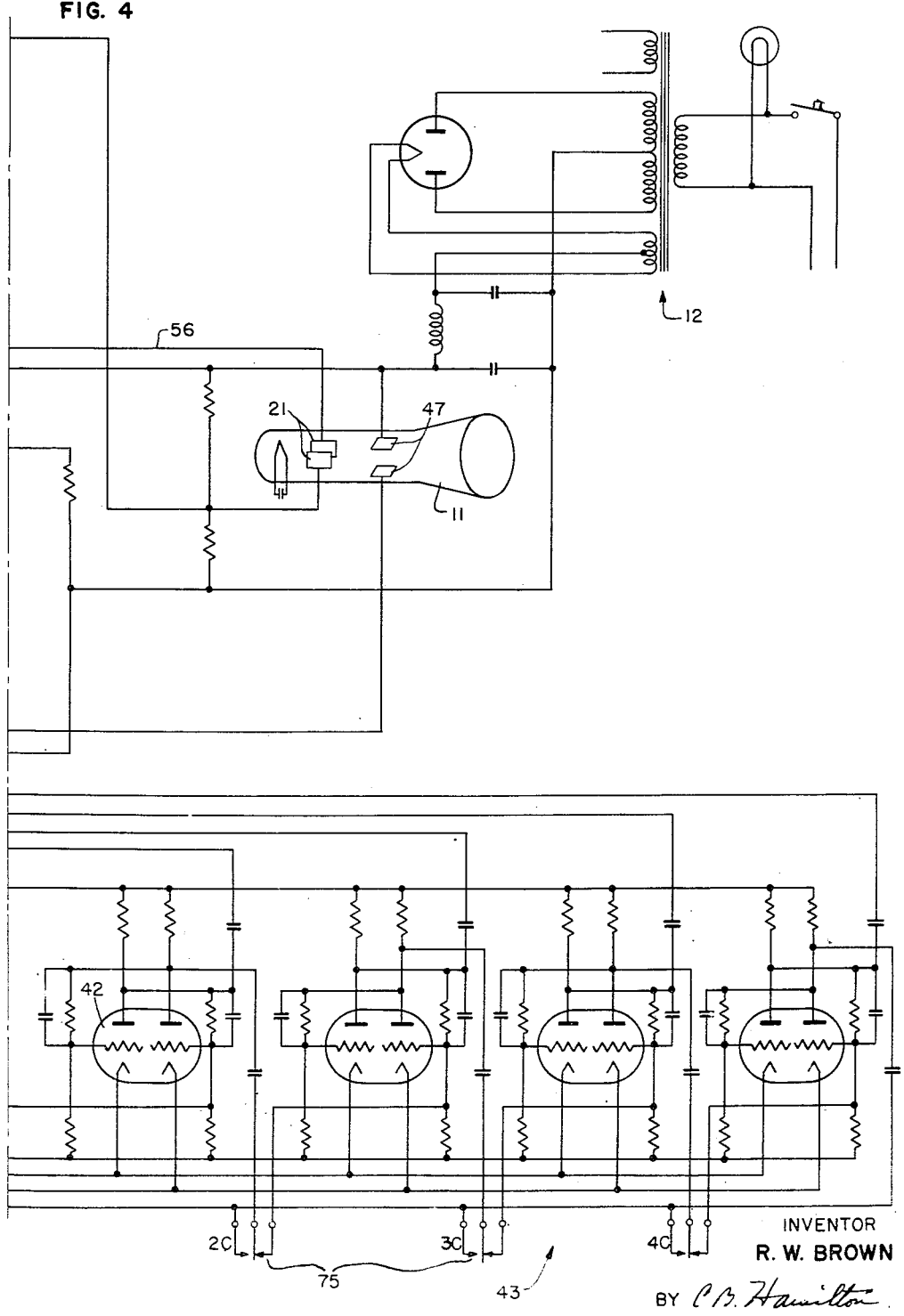

United States Patent Office 2,805,389
Patented Sept. 3, 1957

2,805,389
APPARATUS FOR TESTING ARTICLES

Raymond W. Brown, Evergreen Park, Ill., assignor to Western Electric Company, Incorporated, New York, N. Y., a corporation of New York Application May 27, 1953, Serial No. 357,876

7 Claims. (Cl. 324—28)

This invention relates to apparatus for testing articles, and more particularly to apparatus for testing the operation of a plurality of contacts of a relay.

In the telecommunication arts, multi-contact relays often are used for purposes in which the several contacts of such a relay must operate at a definite point in the actuating travel of an armature of the relay. In some instances, it is essential that all the contacts be closed simultaneously, while sometimes it is necessary that some close before others or open before others. In the past, there has been no apparatus which would quickly test the operative relationship of several contacts of a relay one with respect to another.

An object of the invention is to provide new and improved apparatus for testing articles.

Another object of the invention is to provide new and improved apparatus for testing multi-contact relays.

A further object of the invention is to provide new and improved apparatus for simultaneously testing and indicating the operative conditions of the several contacts of a multi-contact relay.

In an apparatus illustrating certain features of the invention, a plurality of sets of contacts of a relay are sequentially coupled with a plurality of stepped voltages to vertical deflector plates of a cathode ray tube. Transducer means responsive to actuation of the contacts periodically sweep the beam of the tube horizontally. As a result, a horizontal line is formed for each set of contacts and this line is deflected slightly vertically by the changing of the contacts between open and closed positions.

In an apparatus forming a more specific embodiment of the invention, a relay is periodically actuated, and transducer means responsive to the movement of an armature of the relay is utilized to cause a horizontal sweep of a cathode ray tube. The contacts of the relay are sequentially connected to the vertical deflection plates in the cathode ray tube during the sequential sweeps of the horizontal beam, and the beam is deflected vertically by progressively different impedances, one for each set of contacts of the relay so that the beam is in a different vertical position for each set of contacts. Decreased resistance is caused by the closing of each set of contacts to deflect the portion of the beam associated therewith vertically when the set of contacts is closed so that the relative time of closing of the set of contacts with respect to the movement of the armature to the relay is indicated by the vertical deflection of the beam corresponding to that set of contacts. This procedure is repeated by a ring counter circuit at a rate of speed sufficient so that all of the horizontal beams remain on the cathode ray tube screen so that the relative times of closure of the contacts can be compared.

A complete understanding of the invention may be obtained from the following detailed description of an apparatus forming specific embodiments thereof, when read in conjunction with the appended drawings, in which—

Fig. 1 is a side elevation of a portion of an apparatus for practicing a method forming one embodiment of the invention;

Fig. 2 is an enlarged perspective view of another portion of the apparatus;

Fig. 4 is a schematic view of another portion of the wiring diagram designed to be fitted to the portion shown in Fig. 3 to form a complete circuit, and Fig. 5 is an enlarged, fragmentary, front elevation of a portion of the apparatus shown in Fig. 2.

Figure 3:
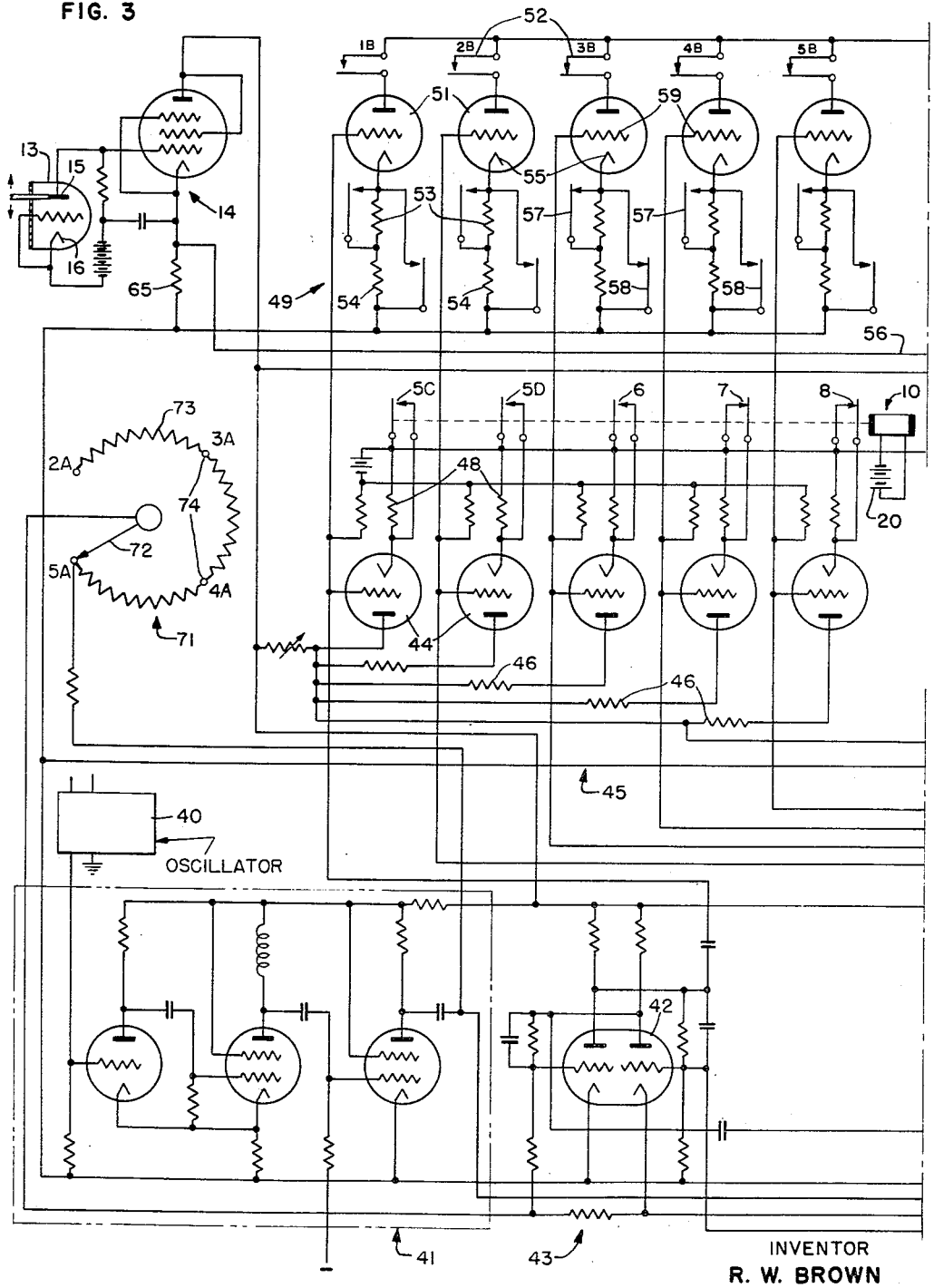
Fig. 3 is a schematic view of a portion of a wiring diagram of the apparatus.

Referring now in detail to the drawings, there is shown therein an apparatus for testing and comparing the operation of sets of contacts 5C, 5D, 6, 7 and 8 of a relay 10. A fixture 9 is provided to connect terminals of the relay and actuate its contacts. The apparatus also includes a cathode ray tube 11 (Fig. 4) suitably connected to a conventional power supply 12. The horizontal sweep of the cathode ray tube 11 is controlled by a commercially available transducer 13 and amplifier tube 14. The transducer is alternately actuated by a plate 15 thereof being moved closer to a cathode 16 as a symmetrical cam 17 (Fig. 1) is driven to permit an armature 18 of the relay 10 under test to actuate the contacts at a rate of approximately ten times per second, the relay being continuously energized by a battery 20 (Fig. 3).

The cam 17 alternately swings a lever 22 mounted on a bracket 23 in a counterclockwise direction, as viewed in Fig. 1, to move the armature 18 to its non-actuated position and permits the relay to move the armature in the opposite, or actuating, direction at a controlled rate of speed, at the same rate of speed as the non-actuating movement thereof, but substantially slower than the normal self-operating speed of the relay. Thus it will be observed that each time the cam 17 permits the armature 18 to close the contacts 5C, 5D, 6, 7 and 8, the transducer 13 gradually increases the current through the amplifier tube 14, thereby gradually increasing the voltage on horizontal deflection plates 21 of the cathode ray tube 11 to cause one horizontal sweep of the cathode ray tube to occur to cause a trace on a screen 25 of the tube 11.

An oscillator 40, set to operate in the vicinity of 75 kilocycles per second when the cam 17 actuates the relay to be tested in about one-twentieth of a second, delivers an alternating voltage of the sine wave type to a pulse-shaping circuit 41 for converting the sine wave voltages into sharp, narrow pulses, which in turn serve to trigger tubes 42 in a ring counter 43 of a well known type. The ring counter is substantially identical in construction and operation with the ring counter circuit shown in Fig. 4 of and disclosed in the article "Hi-speed N-scale counters" by T. K. Sharpless on page 125 of the March 1948 issue of "Electronics." The number of tubes 42 in the ring counter circuit 43 is equal to the number of contacts 5C, 5D, 6, 7 and 8 to be tested, and the ring counter 43 is such that the tubes 42 are pulsed in one after another, proceeding from the lefthand tube 42, shown in Fig. 3, to the righthand tube 42, shown in Fig. 4, and back to the first tube 42 to be pulsed. As each tube 42 in the pulsing circuit 43 pulses, it increases the plate and grid voltages of a corresponding tube 44 in a vertical deflector circuit 45 to cause that tube 44 to conduct. The tubes 44 in the circuit 45 have their cathodes connected through resistors 46 of progressively increasing resistance proceeding from left to right, to lower one of vertical deflection plates 47 of the cathode ray tube 11. Thus, the pulse through each tube 44 in the circuit 43 will cause a portion of the horizontal trace on the cathode ray tube 11 to be offset vertically from the portion of the trace produced during pulsing of the next preceding tube in the circuit 45.

Each of the tubes 44 of the circuit 45 also has a cathode resistor 48 adapted to be shunted by closure of one of the sets of contacts 5C, 5D, 6, 7 and 8 of the relay under test. Therefore, it will be seen that closure of each set of contacts shunts out the associated cathode resistor 48 thereby leaving less resistance in the plate-cathode circuit of the tube 44 associated therewith. This effects a vertical offset to produce a vertical jog in the trace shown on the cathode ray tube. The sets of contacts 5C, 5D, and 6 are "normal make" and "early make," respectively, and the sets of contacts 7 and 8 are "normal break" and "early break," respectively. The "make" contacts are closed as the relay is actuated to cause the beam to be deflected upwardly when the tubes 44 connected thereto are pulsed, and the "break" contacts are opened as the relay is actuated to cause the beam to be deflected downwardly when the tubes 44 associated therewith are pulsed.

A circuit 49 is provided to compensate for "early make" and "normal break" and "early break" contacts in order that all of the traces on the screen from several types of contacts may be lined up so that the jogs will appear within the limits defined by two vertical lines 50 on the tube 11 when all of the contacts are functioning properly. The circuit 49 includes vacuum tubes 51 in parallel with the horizontal deflection plates 21, and manually operable switches 52 having contactors 1B, 2B, 3B, 4B, and 5B in the plate circuits of the tubes 51 for the purpose of connecting the tubes 51 individually into the circuit for the "normal break," "early make" and "early break" contacts. Resistors 53 and 54 connecting cathodes 55 of the tube 51 to a conductor 56 leading to one of the horizontal plates 21 of the cathode ray tube 11 may be individually shunted by switches 57 and 58. The resistors 48 are connected to control grids 59 of the tubes 51 so that each of the tubes 51 connected to the closed switches 52 is fired when the ring counter 43 fires the tube 44 associated with the set of contacts coupled thereto.

The switches 52, 57, and 58 associated with the "early make" contacts 6 are all closed so that the beam is shifted to the right a predetermined distance when the tube 44 connected to the contacts 6 is pulsed. When the tube 44 connected to the "normal break" contacts 7 is pulsed, the beam is shifted less far to the right by having the number 4 switch 52 closed and the corresponding switches 57 and 58 open. The number 5 switches 52 and 57 are closed and the corresponding switch 58 is opened so that only the resistor 54 is in the circuit to shift the beam to the right a distance in between the shifts for the "early make" contacts 6 and the "normal break" contacts 7. These shiftings are effected by changing the voltage from a resistor 65 to the horizontal deflection plates 21. Thus all types of contacts may be tested simultaneously with the jogs in the traces occurring within the same area on the cathode ray tube if the operation of the several sets of contacts 5C, 5D, 6, 7 and 8 are proper.

A potentiometer 71 is connected to the ring counter 43 to adjust it for operations testing relays having less than five sets of contacts. A contactor 72 may be set to contact a tapped resistor 73 at contacts 74 numbered 2A, 3A, 4A, and 5A to correspond to the sets of relay contacts to be tested. One of manually operable switches 75, numbered 2C, 3C, and 4C for the number of sets of relay contacts in the relay to be tested, is closed, the number 4C contact being actuated to cut out the fifth tube 42 if the relay has four sets of contacts.

Operation

The relay is mounted in the fixture 9, which connects the contacts 5C, 5D, 6, 7 and 8 to the circuit as shown in Figs. 3 and 4. Contactor 3B of switch 52 and switches 57 and 58 in the cathode circuit of the tube 51 connected to contactor 3B are closed, contactor 4B of switch 52 is closed, the switches 57 and 58 in the cathode circuit of the tube 51 connected to the contactor 4B are opened, contactor 5B of switch 52 and switch 57 in the cathode circuit of the tube 51 connected to the contactor 5B are closed, and the switch 58 in the cathode circuit of the tube 51 connected to the contactor 5B is opened.

The cam 17 (Fig. 1) is rotated at such a rate of speed and the oscillator 40 is adjusted to such a frequency that the ring counter circuit 43 is cycled many times during each actuation of the relay by the cam. The exact ratio desired will depend on the accuracy desired, a ratio of one hundred cycles of the ring counter while the armature 18 is moved in an actuating direction once having been found to be highly satisfactory. At the start of each actuation of the contacts, the cam 17 moves the plate 15 of the amplifier tube 14 closer to the cathode 16 to increase the current through the tube 14. This actuates the amplifier 14 to cause the horizontal plates 21 of the cathode ray tube 11 to sweep the beam from left to right, as viewed in Figs. 2 and 5. Simultaneously, the oscillator 40 and the pulse-shaping circuit 41 actuate the ring counter 43 to repeatedly connect one after another the stepped resistors 46 to the vertical plates 47 to deflect the ray vertically so that spaced horizontal lines are formed on the screen of the cathode ray tube, one line for each set of the contacts 5C, 5D, 6, 7 and 8.

As the ring counter pulses the tube 44 farthest to the left, as viewed in Fig. 3, the beam forms a bright dot 81 to start line 1 on the screen 25 (Fig. 5) to show the operation of the contact 5C. The ring counter then pulses the tube 44 just to the right of the tube 44 just pulsed, and the resistor 46 associated with the tube 44 being pulsed rapidly deflects the beam to the second line on the screen 25 where a bright dot 82 is formed. Further downward deflections occur as the tubes 44 associated with the contacts 6, 7 and 8 are pulsed seriatim to form bright dots 83, 84 and 85, respectively. As the beam travels downwardly to line 3 on the screen, the tube 51 associated with the contacts 6 is pulsed and deflects the beam to the right to form the dot 83. The beam is shifted back to the left somewhat to form the dot 84 to start line 4 illustrating the action of the "normal break" contacts 7, and then is shifted to the right to line 5 to form the dot 85. The beam then travels rapidly up to line 1 and forms a dot 86 spaced to the right of the dot 81 because the transducer is more conductive as the relay is actuated further. This cycle is repeated many times as the relay is actuated once so that the dots form lines on the screen 25.

As each set of "make" contacts 5C, 5D, and 6 is closed, it shunts the resistor 48 in parallel therewith. This causes the beam to deflect upwardly slightly, and the line on the screen remains at the elevation as long as this set of contacts remain closed. As each set of the "break" contacts 7 and 8, which are "break" contacts, are opened, the resistance of the resistor 48 in parallel therewith is brought fully into series with the cathode of the tube 44 to decrease the current through that tube, which changes the potential on the vertical plates 47 of the cathode ray tube 11 so as to deflect the beam downwardly, and the line for this set of contacts remains at this level across the remainder of the screen, as long as this set of contacts remains open. The position of the change in elevation of each horizontal line on the screen 25 of the tube 11 indicates the positions of the armature during the actuation of the relay in which the contacts open or close, depending on the type of the particular set of contacts, the horizontal sweep of the beam to the right being proportional to the actuating movement of the relay armature. The cam 17 then moves the contacts very rapidly in the non-actuating direction to return the contacts immediately to their non-actuated positions, and then starts another cycle of operation.

The above-described method and apparatus test relays each having several different types of contacts with the single set of markings on the screen on the tube 11. It is highly flexible, and may be readily adjusted to test relays having different patterns of contact types, and in each test gives a simultaneous indication of each set of contacts on the tube 11. Also, since the oscillator 40 and the ring counter 43 operate very rapidly, the cam 17 may be driven at a speed sufficiently high that the lines on the screen are retraced many times per unit of time, thereby obviating the necessity of long-persistency of the screen 25.

Certain features of the invention are disclosed and claimed in copending application Serial No. 357,875, filed May 27, 1953, by R. W. Brown for "Apparatus for Testing Contacts."

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing contacts, which comprises means for periodically actuating a plurality of sets of electrical contacts between normal conditions thereof and actuated conditions thereof, a cathode ray tube having vertical deflection plates and horizontal deflector plates, means responsive to the actuating means for actuating the horizontal plates to sweep the beam of the tube in synchronism with the actuation of the contacts, a plurality of stepped resistances, a D. C. voltage source, means for repeatedly connecting the resistances consecutively in parallel with the vertical deflection plates a multitude of times for each actuating movement of the contacts to form the beam into a series of spaced, horizontal lines, a plurality of resistances connected in series with the first-mentioned resistances, and means coupling the contacts to the vertical deflection plates in positions shunting the second mentioned resistances.

2. An apparatus for testing contacts, which comprises means for periodically actuating a plurality of sets of contacts to move the contacts back and forth between normal conditions thereof to actuated conditions thereof, a cathode ray tube having beam-forming means, vertical deflector plates and horizontal deflector plates, transducer means responsive to the actuating means for actuating the horizontal plates to sweep the beam of the tube in synchronism with the movement of the contacts, a plurality of stepped resistors, cyclic electronic means for repeatedly applying stepped voltages seriatim to the vertical deflector plates a multitude of times for each cycle of the actuating means to form the beam into a series of spaced, horizontal lines one for each set of contacts, and means for varying the voltage applied to the vertical deflection plates as each set of contacts is moved between normal and actuated conditions thereof.

3. An apparatus for testing relay contacts, which comprises a cathode ray tube having a beam-forming element, a fluorescent screen, vertical deflector plates and horizontal deflector plates, a D. C. voltage source, means for periodically actuating a relay having a plurality of sets of contacts, a plurality of stepped resistances each connected to one of the sets of contacts, a ring counter for coupling the stepped resistances in parallel with the vertical deflector plates in synchronism with the operation of the relay actuating means and coupling the sets of contacts sequentially to the vertical deflector plates so that the beam is deflected vertically as the sets of contacts are changed between open and closed conditions, transducer means coupled to the horizontal deflector means, means for actuating the transducer means in accordance with the actuation of the relay, and synchronizing means for actuating the ring counter a multitude of times for each actuation of the transducer means.

4. An apparatus for testing relay contacts, which comprises a cathode ray tube having a beam-forming element, a fluorescent screen, vertical deflector plates and horizontal deflector plates, a voltage source, means for periodically actuating a relay having a plurality of sets of contacts a predetermined number of times per unit of time, a plurality of stepped resistors equal in number to the sets of contacts, ring counter means for coupling the resistors one after another in parallel with the vertical deflector plates a multitude of times for each operation of the relay actuating means and coupling the sets of contacts sequentially to the vertical deflector plates in synchronism with the coupling of the resistors to the vertical deflector plates so that the beam is deflected vertically as the sets of contacts are changed between open and closed conditions, and transducer means operable by movement of the sets of contacts for varying the voltage on the horizontal deflector plates in accordance with movement of the contacts.

5. An apparatus for testing relay contacts, which comprises a cathode ray tube having a beam-forming element, a fluorescent screen, vertical deflector plates and horizontal deflector plates, a D. C. voltage source, cam means for periodically actuating a relay having a plurality of sets of contacts a predetermined number of times per unit of time, transducer means operable by the cam means for applying variable voltages from the voltage source to the horizontal plates to sweep the beam as the contacts are actuated, a plurality of stepped resistors, a ring counter for connecting the resistors and the sets of contacts in parallel with the vertical deflector plates, and an oscillator for actuating the ring counter a multitude of times for each actuation of the relay.

6. An apparatus for testing sequentially operated contacts, which comprises a cathode ray tube having vertical deflection plates and horizontal deflection plates, means for repeatedly actuating the horizontal plates to sweep the beam of the tube, means for periodically operating a plurality of sets of contacts to move the contacts back and forth between normal and actuated positions thereof, voltage-applying means for repeatedly actuating the vertical deflection plates a multitude of times for each sweep of the beam to form the beam into a series of spaced, horizontal lines one for each set of contacts, a plurality of signal circuits one for each set of contacts, means coupling each signal circuit to the vertical deflection plates during the formation of the line for the set of contacts associated with that signal circuit, and means connected in said signal circuits for varying the voltage applied to the vertical deflection plates to vertically vary the position of each line when the set of contacts associated with that line is operated whereby the sequence of operation of the contacts is visibly indicated on the cathode ray tube.

7. An apparatus for testing a plurality of contacts simultaneously, which comprises means for periodically operating a plurality of contacts between normal and actuated positions thereof, a cathode ray tube, means for sweeping the beam of the tube at a predetermined frequency, means for deflecting the beam laterally of its sweeping movement in steps equal in number to the number of contacts to be tested a multitude of times for each sweep of the beam whereby lines are simultaneously formed one for each contact, a plurality of voltage signal circuits one for each contact for deflecting the beam laterally of its sweep, means for making each signal circuit operative while the line for the contact associated with that signal circuit is being formed, and means connected in said voltage signal circuits for varying the lateral deflection of each of said lines when the contact associated with that line is operated.

References Cited in the file of this patent

UNITED STATES PATENTS

| | | |
|---|---|---|
| 2,171,216 | Koch | Aug. 29, 1939 |
| 2,432,944 | Shillington | Dec. 16, 1947 |